(12) United States Patent
Aoto et al.

(10) Patent No.: US 10,955,323 B2
(45) Date of Patent: Mar. 23, 2021

(54) METHOD AND DEVICE FOR MEASURING VISCOELASTICITY

(71) Applicant: NATIONAL UNIVERSITY CORPORATION NARA INSTITUTE OF SCIENCE AND TECHNOLOGY, Nara (JP)

(72) Inventors: Takahito Aoto, Nara (JP); Yasuhiro Mukaigawa, Nara (JP)

(73) Assignee: National University Corporation Nara Institute of Science and Technology, Nara (JP)

( * ) Notice: Subject to any disclaimer, the term of this patent is extended or adjusted under 35 U.S.C. 154(b) by 51 days.

(21) Appl. No.: 16/319,329

(22) PCT Filed: Jul. 21, 2017

(86) PCT No.: PCT/JP2017/026585
§ 371 (c)(1),
(2) Date: Jan. 21, 2019

(87) PCT Pub. No.: WO2018/016652
PCT Pub. Date: Jan. 25, 2018

(65) Prior Publication Data
US 2019/0277739 A1 Sep. 12, 2019

(30) Foreign Application Priority Data
Jul. 21, 2016 (JP) .............................. JP2016-143260

(51) Int. Cl.
*G01N 3/36* (2006.01)
*G01N 3/06* (2006.01)
*G01N 11/00* (2006.01)

(52) U.S. Cl.
CPC ............... *G01N 3/36* (2013.01); *G01N 3/068* (2013.01); *G01N 11/00* (2013.01); *G01N 2203/0094* (2013.01)

(58) Field of Classification Search
CPC ........... G01N 11/00; G01N 2203/0094; G01N 3/068; G01N 3/36
(Continued)

(56) References Cited

U.S. PATENT DOCUMENTS 6,176,832 B1 * 1/2001 Habu .................... A61B 5/0285
600/485
9,494,475 B2 * 11/2016 Hadj Henni .............. G01L 1/24
(Continued)

FOREIGN PATENT DOCUMENTS

JP 60-55244 A 3/1985
JP 06-313752 A 11/1994
(Continued)

OTHER PUBLICATIONS

"International Search Report", PCT/JP2017/026585, dated Oct. 24, 2017, 2 pages.
(Continued)

*Primary Examiner* — Max H Noori
(74) *Attorney, Agent, or Firm* — Ogilvie Law Firm

(57) ABSTRACT

To provide a method whereby viscoelasticity of an object can be measured nondestructively and in non-contact fashion in a short time. By this method, elastic waves and light are radiated to an object and the viscoelasticity of an object is measured nondestructively and in non-contact fashion using a shadow change based on a change in the direction of a line normal to the surface of the object. Specifically, the present invention has an elastic wave transmission step for pressurizing or exciting the object by elastic waves and causing a minute displacement of the object surface shape,
(Continued)

a photoirradiation step for radiating light to the minutely displaced object surface, an image acquisition step for acquiring a shadow change based on a change in the direction of a line normal to the object surface, and a viscoelasticity estimation step for processing an image of the acquired shadow change and calculating a viscoelasticity.

15 Claims, 15 Drawing Sheets

(58) Field of Classification Search
USPC .......................................................... 73/800
See application file for complete search history.

(56) References Cited

U.S. PATENT DOCUMENTS

| | | | | |
|---|---|---|---|---|
| 10,327,739 | B2* | 6/2019 | Zheng | A61B 8/463 |
| 2007/0086919 | A1* | 4/2007 | Akcakir | G01Q 20/02 |
| | | | | 422/82.05 |
| 2008/0208044 | A1* | 8/2008 | Lecoq | A61B 8/0825 |
| | | | | 600/436 |
| 2012/0271166 | A1 | 10/2012 | Shao et al. | |
| 2018/0328798 | A1* | 11/2018 | Silver | G01L 1/103 |
| 2020/0077897 | A1* | 3/2020 | Saeki | A61B 5/0066 |

FOREIGN PATENT DOCUMENTS

| | | |
|---|---|---|
| JP | 2007-76053 A | 3/2007 |
| JP | 2008-241323 A | 10/2008 |
| JP | 2010-523974 A | 7/2010 |
| JP | 2012-37420 A | 2/2012 |
| JP | 2016-042960 A | 4/2016 |

OTHER PUBLICATIONS

Masayuki Ito, et al., "Non-contact Type Viscometer Using Aero Sound", Technical Report of IEICE, Apr. 17, 2007, vol. 107, No. 20, pp. 17-22.

Tsutomu Kobayashi, et al., "Viscometer of noncontact type using aerial sound", Ultrasonic Technology, May 20, 2007, vol. 19, No. 3, pp. 5-8.

* cited by examiner (1) Non Vibration     (2) Minute Vibration     (3) Strong Vibration (a)Target object (e)Result (b)Non-vibrated (c)Vibrated1

(d)Vibrated2

(1)

(2)

(1)

(2)

METHOD AND DEVICE FOR MEASURING VISCOELASTICITY

TECHNICAL FIELD

The present invention relates to a method and an apparatus for non-contact, non-destructive and non-invasive measurement of viscoelasticity of an object.

BACKGROUND ART

When an external force is applied to an object, deformation and flow occur simultaneously in the object. At this time, the property that combines the ease of deformation and the ease of flow of the object is called viscoelasticity and it is known that, by examining this viscoelasticity, evaluation of a structure and physical properties becomes possible, efficiency of material design can be improved and sensory evaluation by objective evaluation of tactile sensation can be supplemented.

Conventionally, as a method of measuring the viscoelasticity of an object, a method of directly measuring the displacement of the object surface by applying pressure or vibration employing a contact type probe is generally used. For example, devices are known wherein a probe is manually pressed against the surface of the object or pressed by the weight of the housing so that the probe contacts the surface of the object or pressed by the weight of the housing so that the probe contacts the surface of the material and evaluates material properties with respect to material impressions. (For example, refer to Patent literatures 1 and 2.)

As described above, it is difficult to repeatedly use valuable or delicate samples in the method of measuring the displacement of the object surface by applying stress to the target object directly in contact with the object. Therefore, a method for estimating the viscoelasticity of the target object in non-contact and non-destructive manner is required. In order to estimate the viscoelasticity of the target object in non-contact and non-destructive manner, it is necessary to apply mechanical stress to the target object in a non-contact manner.

As a method of measuring the viscoelasticity of an object in a non-contact manner, a method of measuring the displacement when pressurizing or vibrating the object surface by the impact of sound waves or air using a laser displacement meter or the like is known. For example, an ultrasonic diagnostic apparatus is known wherein, based on a plurality of frames generated by scanning ultrasonic beams, a temporal change in the displacement amount of the object is calculated, a displacement waveform of the displacement amount is generated, and the viscoelasticity of the object is estimated according to the displacement amount. (For example, refer to Patent literature 3.)

Also a method of estimating viscoelasticity by acquiring a periodic motion of a texture on the surface of an object using an image processing is known. (For example, refer to Non-patent literature 1.)

PRIOR ART

Patent Literature

[Patent literature 1] JP 2010-523974 A
[Patent literature 2] JP 1994-313752 A
[Patent literature 3] JP 2016-42960 A

Non-Patent Literature

[Non-patent literature 1] Davis, A., Bouman, K. L., Chen, J. G., Rubinstein, M., Durand, F., & Freeman, W. T. "Visual vibrometry: Estimating material properties from small motions in video". Proc. IEEE Conf. CVPR2015 (pp. 5335-5343).

OUTLINE OF THE INVENTION

Problems to be Solved by the Invention

As described above, there is a problem, in the method of directly measuring viscoelasticity by contact, that measuring valuable or delicate samples is difficult because of a high possibility of destroying or deforming the contact portion invasively or plastically. In addition, in the method of measuring viscoelasticity in a non-contact manner, the displacement generated by exciting and/or pressurizing the object surface is measured by using an optical method such as a laser displacement meter, and it is accordingly difficult, in principle, to measure the viscoelasticity of the object that is difficult to measure displacement optically due to phenomena such as scattering, specular reflection, transmission and refraction. Also, in the method of measuring the viscoelasticity without contact, it is necessary to make the object resonate by using the natural frequency in order to accurately measure the displacement which necessitates a search for the natural frequency, resulting in prolonged measurement time.

In view of the above circumstances, it is an object of the present invention to provide a method and an apparatus whereby viscoelasticity of an object can be measured in a non-contact and non-destructive manner in a short time.

Means to Solve the Objects

In order to solve the problem above, the viscoelasticity measuring method of the present invention is a method of measuring the viscoelasticity of an object in a non-contact and non-destructive manner, comprising the steps of irradiating an object with an elastic wave and light, which leads to estimation of viscoelasticity based on the shading change due to the change of the normal direction of the object surface.

In the method for measuring viscoelasticity of the present invention, the viscoelasticity is estimated by minutely displacing the object surface shape by irradiating an elastic wave and pressurizing or exciting an object to be measured, and also by the shading change generated by a change in the normal direction of the surface of the object by irradiating a light to the surface of the object.

In the method for measuring viscoelasticity of the present invention, the viscoelasticity of the object is indirectly estimated from the shading change based on the change in the normal direction caused by the minute displacement, not directly measuring the displacement that occurs on the object surface, and accordingly the following advantages 1) to 3) are listed.

1) It is possible to measure the viscoelasticity of an object in no contact even when the object is a substance having light phenomena such as scattering, mirror reflection or refraction which make it difficult to optically measure the displacement directly.

2) Since having the object of the test object to resonate is not required, search for natural frequency is unnecessary and the measurement in a short time is possible. Also, it is unnecessary to select the frequency at which the object is vibrated.
3) Since the extent of pressurization is sufficient wherein a change in the normal direction can be estimated, it is possible to estimate the viscoelasticity of the object with a smaller displacement than in the conventional method with a smaller risk of plastic deformation of the object due to pressurization and excitation and the viscoelasticity of the object can be measured non-destructively.

Here, as elastic waves, sound waves and ultrasonic waves in particular can be suitably used. It is assumed here that what pressurizes or excites by the impact of air is to be included in the elastic wave. The elastic wave is not only an elastic wave in air but may also be elastic waves in gas, liquid or semisolid.

Further, as the substance of the object, a liquid or semisolid substance is used as a measurement object, but the substance may be a solid such as a flexible plastic or a polymer substance such as rubber.

In addition, it is necessary for the micro displacement generated by the irradiation of an elastic wave, to be a displacement small enough so that it does not cause any problem even assuming that the object surface shape does not change. Namely, in the object surface shape, the displacement amount changes before and after the application of the elastic wave application need to stay within a predetermined small range. For this reason, the surface of the object is changed minutely by vibration or pressurization using an acoustic wave or an air bombardment either of non-resonant frequency, where the object surface does not resonate. Here, the displacement in the normal direction is large even when the object surface change is very small. For this reason, it is regarded that only the normal direction changes without changing the shape of the object by satisfying the assumption above.

And when the surface shape is minutely displaced and the light is irradiated on the object surface, the shading on the object surface changes based on the change in the normal direction of the object surface, making it possible to estimate the viscoelasticity from the observed shading information. This makes it possible to measure the viscoelasticity of the object from the change of the shading information occurring on the object surface due to the change in the normal direction even in a situation where the displacement of the object surface is minute and difficult to measure.

The method for measuring viscoelasticity of the present invention specifically comprises the following a) to d).
a) An elastic wave transmission step for pressurizing or exciting the object by elastic waves and causing a minute displacement of the object surface shape;
b) A photoirradiation step for radiating light against an object surface being minutely displaced;
c) An image acquisition step for acquiring a shading change based on a change of the object surface in a normal direction;
d) A viscoelasticity estimation step for calculating viscoelasticity by acquiring a displacement magnitude of a pixel intensity from an image of an acquired shading change.

Here, in the image acquisition step, a shading change of the object surface is acquired as an image by using the camera. Then, the displacement waveform of the displacement amount of the pixel intensity is acquired from the acquired shading change image to calculate the viscoelasticity.

The elastic wave used in the method for measuring viscoelasticity of the present invention is preferably a sound wave or an ultrasonic wave the frequency thereof is not limited to a specific frequency including the resonance frequency of the object to be measured. Because, a search for a resonance frequency or another specific frequency is not necessary, making it possible to perform measurement in a short time. Also, the frequency tuning of the sound waves and ultrasonic waves is not necessary because it is unnecessary to select the frequency whereat the object is vibrated. In particular, the ultrasonic wave being a compressional wave and when the intensity thereof is strong enough, it is possible to perform a dynamic work in a non-contact manner with respect to the object.

In the viscoelasticity estimating step in the method for measuring viscoelasticity of the present invention, the scattered light component is eliminated from the pixel intensity of the acquired shading change image of the non-vibrating object surface, and the viscoelasticity is calculated from the shading change based on the observation time in the observation area determined from the positional relationship between the object surface and the camera unit with respect to the single vibration cycle of the displacement waveform of the displacement amount of the light component intensity after eliminating the scattered light component.

In the method for measuring viscoelasticity of the present invention, shaded images at the object surface generated by at least two kinds of minute vibration are acquired by minutely changing the intensity of the elastic wave in the elastic wave transmitting step, and in the viscoelasticity estimation step, the viscoelasticity is calculated based on the difference in the observation time due to the change in the observation time of the abovementioned shading change in the shading image of the object surface generated by at least two kinds of minute vibration.

In the method for measuring viscoelasticity of the present invention, the viscoelasticity of the object surface is calculated by a calculation from at least two types of shading change in the shading images when at least two types of elastic waves having different types of elastic waves having different intensities are applied to the object surface. In actual observation of the shading change, viscoelasticity is calculated by using a shading image obtained by an exposure for a longer time than the cycle of the elastic waves, not a shading change by the period of elastic waves.

In the method for measuring viscoelasticity of the present invention, it is preferable to vibrate the surface of the object to be measured at the focusing point so that the sound waves respectively transmitted from the plurality of sound wave transmitting modules are focused in the same phase, in the elastic wave transmitting step. Displacement of the surface of the object can be easily given by focusing the sound waves transmitted from the plural sound wave transmitting modules respectively at the same phase and causing the object surface to oscillate at the converging point. Further, in the elastic wave transmitting step, sound waves respectively transmitted from a plurality of sound wave transmitting modules may be transmitted in parallel with the same phase, and the surface of the object to be measured may be vibrated on the surface.

In addition, the method for measuring viscoelasticity of the present invention comprises the following A) to F).
A) A static shading distribution acquisition step for acquiring static shading distribution information by irradiating light on object surface in static state with a elastic wave not being applied;

B) An elastic wave transmission step for minutely displacing object surface shape by pressurizing or vibrating an object;
C) A photoirradiation step for irradiating light on an object surface with minute displacement;
D) A dynamic shading distribution acquisition step for acquiring dynamic shading distribution information based on vibration of normal line on an object surface;
E) A maximum displacement estimation step for estimating a maximum displacement caused by an elastic wave of an object by calculating angular velocity of vibration of a normal line after calculating time of 1 cycle of said vibration from a ratio of said static shading distribution information and said dynamic shading distribution information;
F) A viscoelasticity estimation step for calculating viscoelasticity from estimated maximum displacement and maximum stress by an elastic wave.

According to the above steps A) to F), by taking the ratio of the static shading distribution information observed when the target object surface is static and the dynamic shading distribution information observed when the target surface is minutely vibrated, and calculating the time wherein the light enters the position observed within one period of the vibration of the normal line to calculate the time of one period of the vibration of the normal line and the angular velocity of the vibration angular velocity of the vibration in the normal line is calculated to estimate the maximum displacement due to the elastic waves of the object. Then, the viscoelasticity is calculated from the estimated maximum displacement and the maximum stress due to the elastic wave.

In the method for measuring viscoelasticity of the present invention, a shading change based on a change in the direction of the normal line at the object surface occurs by the reflected light of the irradiation light reflected from the object surface or transmitted light that is transmitted through and refracted by the object to be measured.

Next, the viscoelasticity measuring apparatus of the present invention is described.

The apparatus for measuring viscoelasticity of the present invention is an apparatus that measures viscoelasticity of an object in a non-contact and non-destructive manner comprising the following 1) to 4).
1) An elastic wave transmitting unit for minutely displacing an object surface shape by pressuring or stimulating an object by an elastic wave;
2) A photoirradiation unit for irradiating light on an object surface with a micro displacement;
3) A camera unit for acquiring a shading change based on a change of object surface in a normal direction;
4) An estimation unit for estimating viscoelasticity by acquiring a displacement of a pixel intensity from an image of an acquired shading change.

The elastic wave transmitted from the elastic wave transmitting unit described above is preferably a sound wave or an ultrasonic wave which is not limited to a specific frequency including the resonance frequency of the object to be measured. It should be noted that not only sound waves and ultrasonic waves in air but also sound waves and ultrasonic waves in gases, liquids and semisolids may be used.

The estimation unit described above, by using the shading image of the non-vibration object surface, eliminates the scattered light component from the pixel intensity of the shading change image, and calculates the viscoelasticity from the shading change based on the observation time in the observation area determined by the positional relationship between the object surface and the camera unit, regarding a single vibration period of shear displacement waveform in the displacement magnitude of light component intensity excluding scattered light component.

The photoirradiating unit described above is arranged in such a way that a shading change based on the change of the object surface in the normal direction is generated by a reflected light reflected at the object surface of the measurement object or a transmitted light refracted while transmitting the object.

It is preferable that the elastic wave transmitting unit described above is composed of a plurality of sound wave transmitting modules, and each of the sound transmitting module is arranged so that each sound wave transmitted is converged in phase and the elastic wave transmitting units are arranged in such a way that the convergent point is positioned on the surface of the object. This is because the displacement at the object surface can be easily provided. Also, each of the sound wave transmission modules may be arranged in such a manner so that the sound wave transmitted from each wave transmission module transmits in phase and in parallel causing the surface of the object to vibrate in the surface plane.

In addition, the apparatus for measuring viscoelasticity of the present invention irradiates an object with an elastic wave and light, and measures the viscoelasticity of the object in noncontact and in non-destructive way based on the shading change in the normal direction of the surface of the object, having the following configurations a) to f).
a) A static shading distribution information acquiring unit for acquiring static shading distribution information by irradiating a light on an object surface in a static state without elastic wave being added;
b) An elastic wave transmission unit for pressurizing or exciting an object for minutely displacing an object surface shape by an elastic wave;
c) A photoirradiating unit for irradiating a light against an object surface with minute displacement;
d) A dynamic shading distribution information acquiring unit for acquiring dynamic shading distribution information based on vibration of normal line at object surface;
e) A maximum displacement estimation unit for estimating a maximum displacement of an object by an elastic wave by calculating a time of 1 cycle of said vibration and calculating an angular velocity of a vibration of normal line, from a ratio of said static shading distribution information to the dynamic shading distribution;
f) A viscoelasticity estimation unit for calculating viscoelasticity from estimated maximum displacement and maximum stress by the elastic wave.

According to the configurations a) to e), using the ratio of the static shading distribution information observed when the target object surface is static, to the dynamic shading distribution information observed when the target object surface is slightly vibrating, the time wherein a light enters at the observed position within one cycle of the vibration in the normal direction is calculated and the time of one cycle of the vibration of the normal line is calculated and the angular velocity of the normal line vibration is calculated to estimate the maximum displacement caused by the elastic wave of the object. And the viscoelasticity is calculated from the estimated maximum displacement and the maximum stress caused by the elastic wave.

Effects of the Invention

According to the method and the apparatus for measuring viscoelasticity of the present invention, it becomes possible to be measured viscoelasticity of an object in a non-contact and non-destructive manner in a short time.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Embodiment 1

Figure 1:
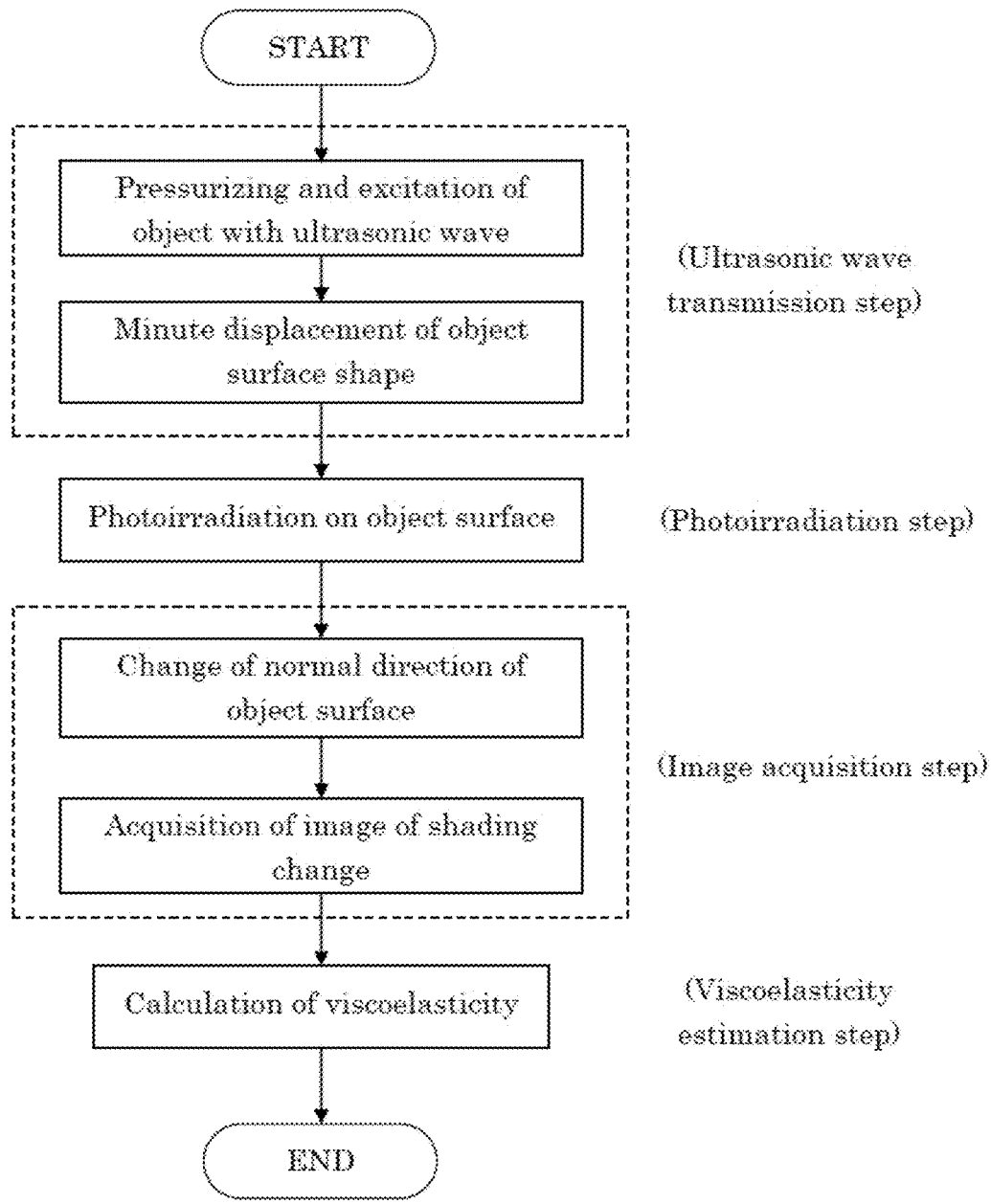
FIG. 1 shows a processing flow of a method for measuring viscoelasticity.

First, one embodiment of the method for measuring viscoelasticity of the present invention is described. FIG. 1 shows the processing flow of the method for measuring viscoelasticity here. As shown in FIG. 1, the processing of the method for measuring viscoelasticity includes 4 steps, which are an ultrasonic emitting step, a photoirradiating step, an image acquiring step and a viscoelasticity estimating step.

1) Ultrasonic Transmission Step

In this step, the object surface of the object is ultrasonically pressurized and vibrated so that the object surface shape is minutely displaced. The frequency of the ultrasonic wave is not limited to a specific frequency including the resonance frequency of the test object. Namely, it does not require the search time for the resonance frequency that resonates the object to be tested. The substance of the object is placed in the air and the ultrasonic wave propagates in the air. Also, a liquid or semisolid substance is used as a substance of the object.

Minute displacement is a displacement so small that it does not pose a problem even when the object surface shape is assumed to be unchanged. When ultrasonic waves are irradiated on the surface of the object, vibrations are generated on the surface of the object, but the amount of change in the displacement before and after the irradiation are set to stay within a predetermined small change. However, the specific control is carried out by a photoirradiation step, having the fluctuation width of the reflected light to fall within a predetermined range.

Figure 8:
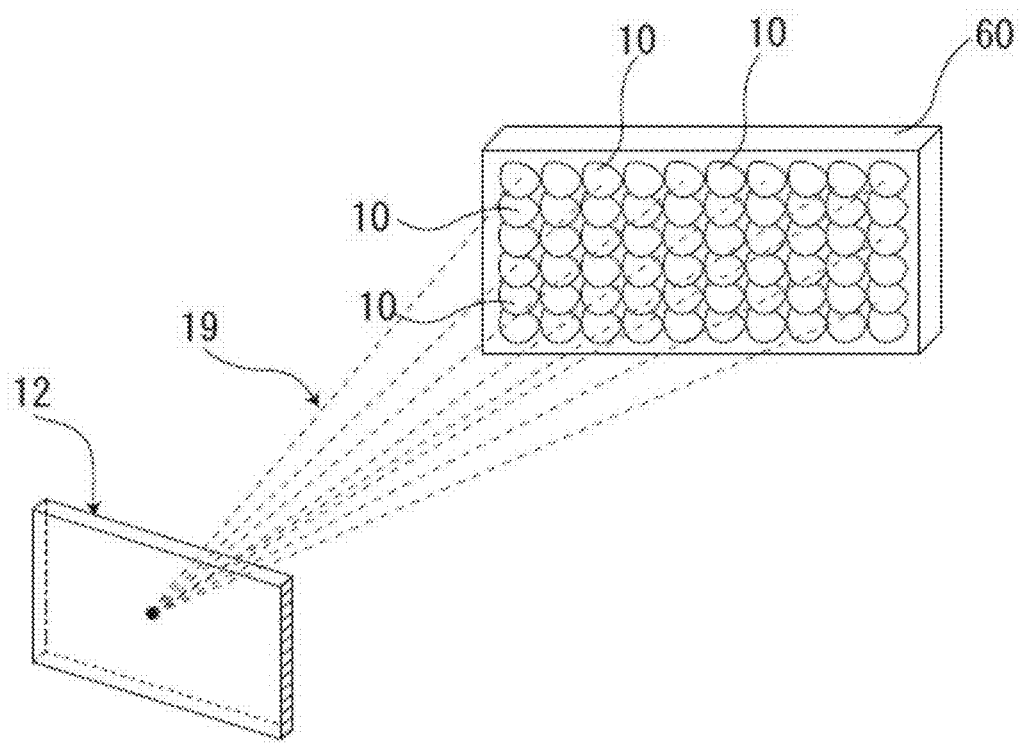
FIG. 8 shows an explanatory view of an ultrasonic transmitter comprising a plurality of ultrasonic transmission modules.

As shown in FIG. 8, the ultrasonic transmitter 60 to be used is arranged so the ultrasonic waves 19 transmitted from the plurality of ultrasonic transmission modules 10 respectively converge to one point, and ultrasonic waves are transmitted so that the convergent point is located at the object surface 12 of the measurement object, thereby increasing the intensity of the ultrasonic wave.

2) Photoirradiation Step

In this step, light is irradiated to the object surface that is minutely displaced. The wavelength of the irradiation light is not particularly limited, but a general illumination light is used because it is necessary to photograph shadings on the surface of the object with a camera.

When the object surface is minutely displaced and the light is irradiated simultaneously, the shading on the object surface changes based on the change in the normal direction of the object surface. If the irradiated light is a mirror reflected light that reflects at the object surface of the test object or the test object is transparent, the transmitted light that is refracted through the object of the test object can be used.

3) Image Acquisition Step

In this step, an image of the shading change based on the change in the normal direction of the object surface is acquired.

For acquisition of images, digital cameras and digital video cameras are used. Light is irradiated on the object surface that is minutely displaced by ultrasonic irradiation and a shading change appearing on the surface of the object under a state of minute displacement and a photoirradiation is photographed by a camera. The photographed image is transferred to a computer for calculating viscoelasticity.

4) Viscoelasticity Estimation Step

In this step, the displacement amount of the pixel intensity is acquired from the acquired shading image to calculate the viscoelasticity. The viscoelasticity estimation method will be described later.

Figure 2:
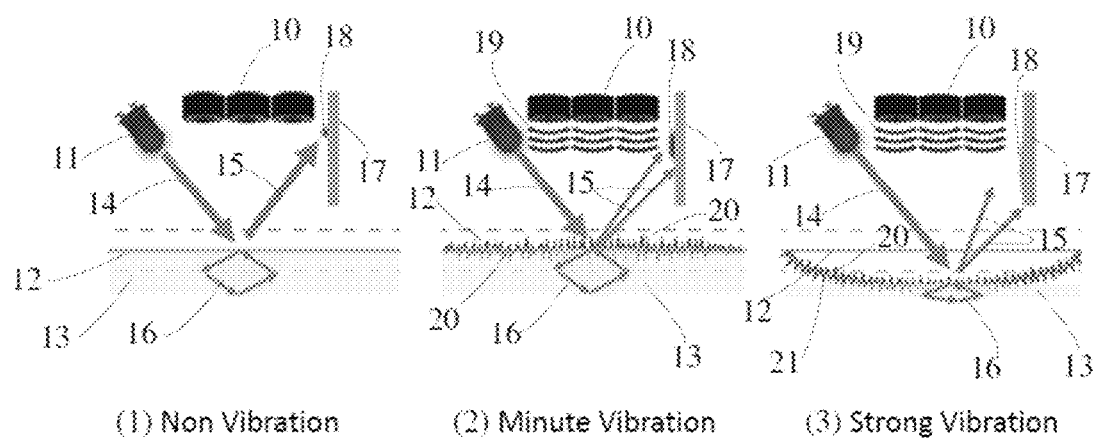
FIG. 2 shows an explanatory view (1) of a method for measuring viscoelasticity.
Figure 3:
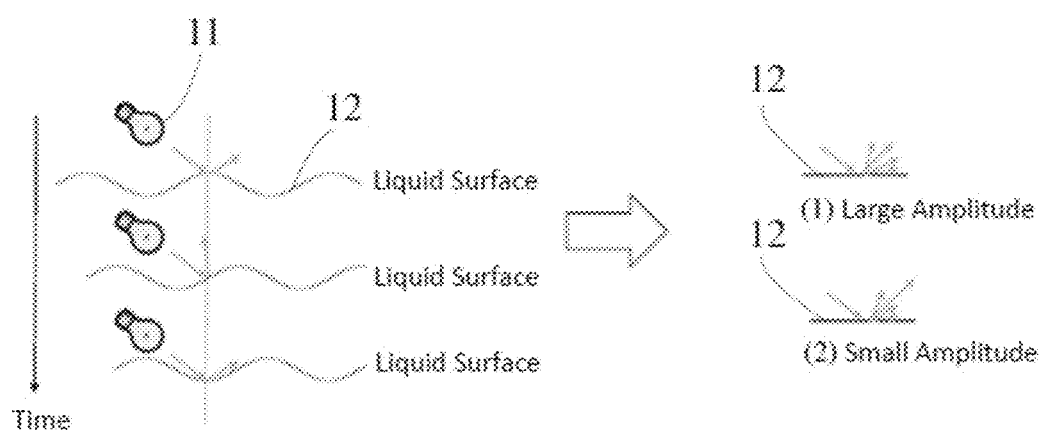
FIG. 3 shows an explanatory view (2) of the method for measuring viscoelasticity.

FIG. 2 and FIG. 3 are explanatory views of the method for measuring viscoelasticity. FIG. 2 (1) is a schematic diagram of a state in which the object surface is not vibrated. A light is irradiated from the illumination light source 11 to the object surface 12, but ultrasonic waves are not transmitted from the ultrasonic transmission module 10. Therefore, the irradiation light 14 is mirror reflected with respect to the object surface 12, and the reflected light 15 reaches the light receiving surface 17 to form a light receiving region portion 18. In the object interior 13, the scattered light 16 from the irradiation light 14 is generated, and a part of the scattered light 16 reaches the light receiving surface 17 to form the light receiving region portion 18.

FIG. 2 (2) is a schematic diagram of a state in which the object surface is slightly vibrated by ultrasonic wave irradiation. An ultrasonic wave 19 is transmitted from an ultrasonic transmitting module 10 and a minute displacement 20 is generated on the object surface 12. When a light is irradiated from the illumination light source 11 in a state wherein the ultrasonic wave 19 is being transmitted from the ultrasonic transmission module 10, a minute displacement 20 on the object surface 12 causes the reflected light 15 to swing, resultantly. Even if the surface shape of the object is a minute displacement, the light receiving region 18 has an expansion to a certain extent because the object changes largely in its normal direction, making the swing width of the reflected light large. It should be noted here that the shape of the object does not change and only the normal direction is assumed to be changed in the case of such a minute displacement.

FIG. 2 (3) is a schematic diagram of a state in which the object surface vibrates strongly by ultrasonic irradiation. An ultrasonic wave 19 is transmitted from the ultrasonic transmitting module 10 and a strong vibration on the object surface 12 is generated, which deforms the line on the object surface and the shape of the object is consequently deformed (the shape-deformed object surface 21). When a light is irradiated from the illumination light source 11 in a state wherein the ultrasonic wave 19 is strongly transmitted from the ultrasonic transmission module 10, due to a strong vibration being generated at the object surface 12, the surface shape of the object changes and consequently it cannot be regarded that only the normal direction is changed without any change of the object shape. Based on the shape change of the object surface, the reflected light 15 resultantly swings greatly and the light receiving region 18 is greatly broadened.

FIG. 3 shows a state, as shown in FIG. 2 (2), namely a state wherein the object surface is slightly displaced by ultrasonic wave irradiation. When the irradiation of ultrasonic waves to the object surface continues, minute displacement of the object surface continues, and the surface of the object generates minute vibration. When one point on the object 12 is observed, the amount of displacement of the minute displacement changes with the lapse of time. Accordingly, the direction of the reflected light due to mirror reflection of the irradiation light from the illumination light source 11 changes. The direction of the reflected light of the object surface 12 varies depending on the amplitude of the minute vibration. Therefore, when observing the object surface 12 from outside, a shading change occurs.

Embodiment 2

Figure 4:
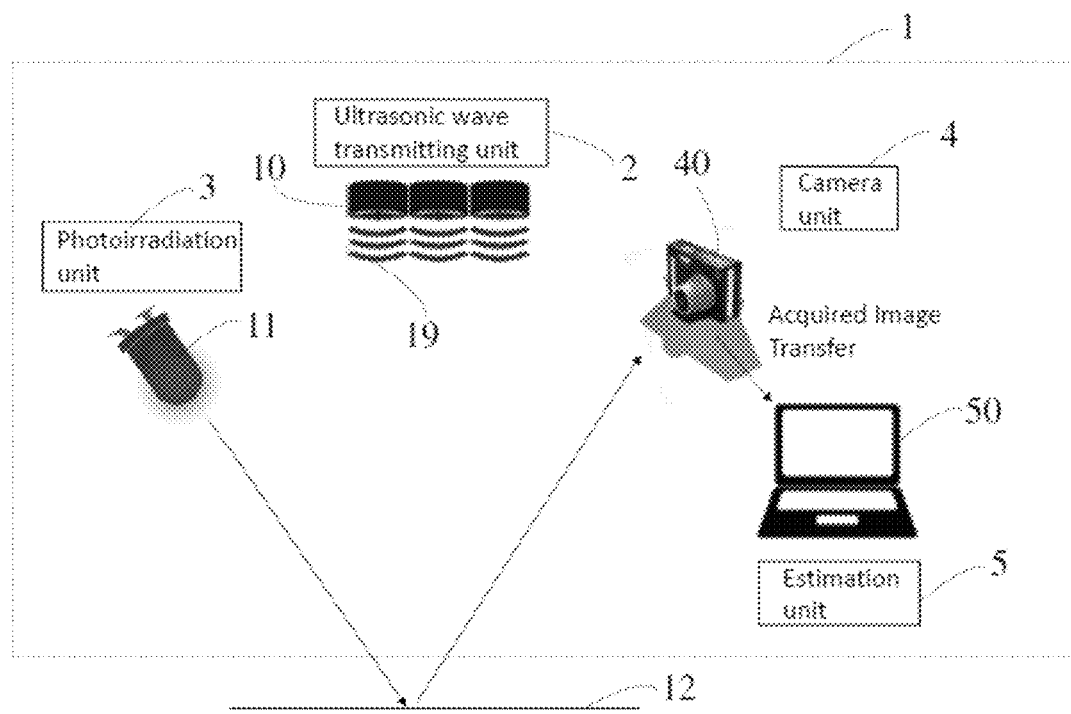
FIG. 4 shows a functional block diagram of an apparatus for measuring viscoelasticity of an embodiment.

Next, one embodiment of the apparatus for measuring viscoelasticity of the present invention is described. FIG. 4 shows a functional block diagram of the apparatus for measuring viscoelasticity of the embodiment.

The apparatus for measuring viscoelasticity 1 is configured of an ultrasonic wave emitting unit 2 for slightly displacing the surface shape of the object surface 12 by vibrating an object with ultrasonic waves, a photoirradiating unit 3 for irradiating light on the object surface 12, A camera unit 4 that acquires a shading change, and an estimation unit 5 that calculates viscoelasticity from the acquired shading change image.

The frequency of the ultrasonic wave is not limited to a specific frequency including the resonance frequency of the object of the test object, and does not require the search time of the resonant frequency to resonate the object of the test object. The intensity of the ultrasonic wave is adjusted so that the fluctuation width of the reflected light falls within a predetermined range so that the micro displacement is small enough not to cause any problem even under an assumption that the object surface shape does not change.

In the estimating unit 5, using a shading image of the non-vibrating object surface, the viscoelasticity is calculated based on the observation time in the observation region determined from the positional relationship between the object surface and the camera unit with respect to the single vibrational period of the displacement waveform of the displacement amount of the light component intensity excluding the scattered light component.

Embodiment 3

Next, the viscosity estimating step is explained. Firstly, the behavior of the reflected light on the object surface when the object surface is slightly vibrated is explained.

Figure 5:
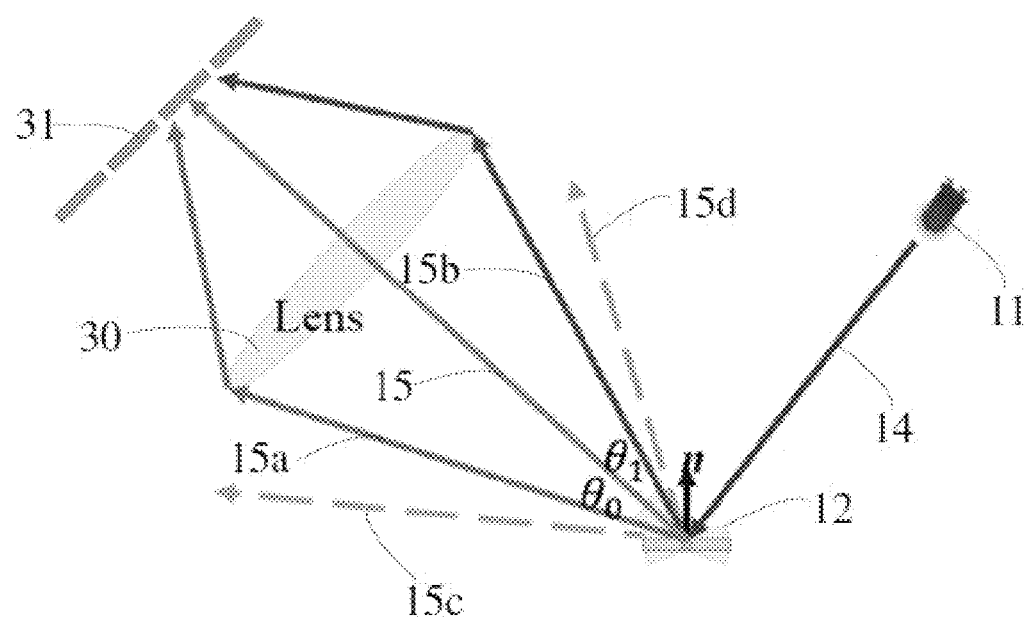
FIG. 5 shows a schematic diagram of positional relationship between a reflected light on an object surface, a camera lens and a camera sensor.

FIG. 5 is a schematic diagram showing the positional relationship between the reflected light on the object surface, the camera lens and the camera sensor. The irradiated light 14 emitted from the irradiation light source 11 is mirror reflected at the vibrating surface in accordance with the direction of the normal line n of the object surface 12. Since the object surface 12 minutely vibrates, the direction of the reflected light 15 varies according to the vibration. The reflected light will be observed on the picture element of the camera sensor corresponding to the direction φ between the angle $φ_0$ and the angle $φ_1$. Therefore, when the object surface 12 is photographed by the camera, the reflected light (15, 15a, 15b) that has passed through the camera lens 30 reaches the camera sensor 31 and is imaged, but reflected light (15c, 15d) deviating from the camera lens 30, does not reach the camera sensor 31 and is not imaged.

Figure 6:
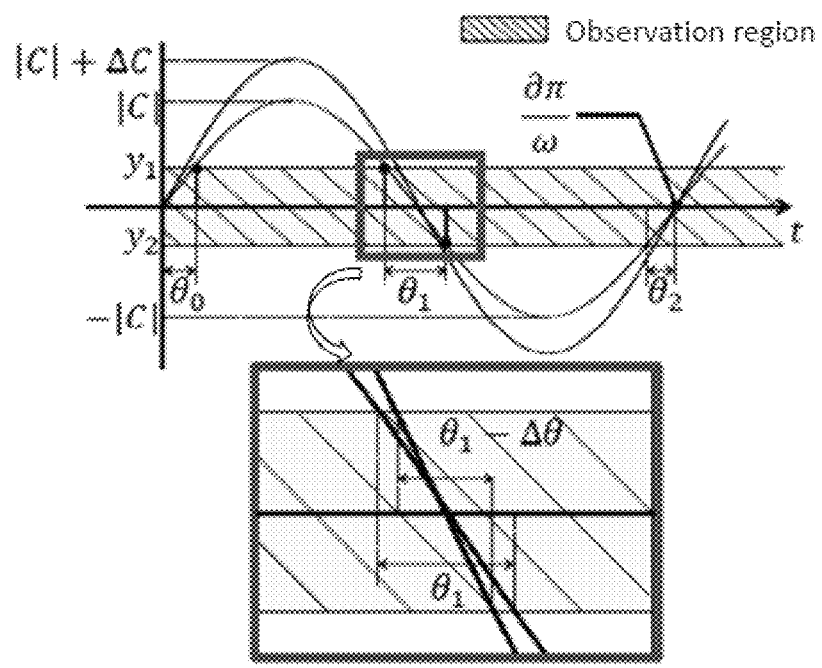
FIG. 6 shows an explanatory view of vibration cycle and observation region of a reflected light within a pixel of camera sensor.

Namely, it is necessary to observe the temporal change of the displace amount of the pixel intensity expressed by the image of the shading change at the object surface assuming that the light reflected at the object surface with minute displacement with a presumption that some of that light that deviates from the camera lens 30 exists. Therefore, when the displacement amount of the reflected light 15 within the picture element of the camera sensor 31 is considered, the viscoelasticity is estimated by capturing this displacement waveform within the observation region, by arranging a observation region against the displacement waveform of the displacement of the light intensity inside the pixel of the camera, as shown in FIG. 6.

Hereinafter, the viscoelasticity estimation steps are described.

Figure 7:
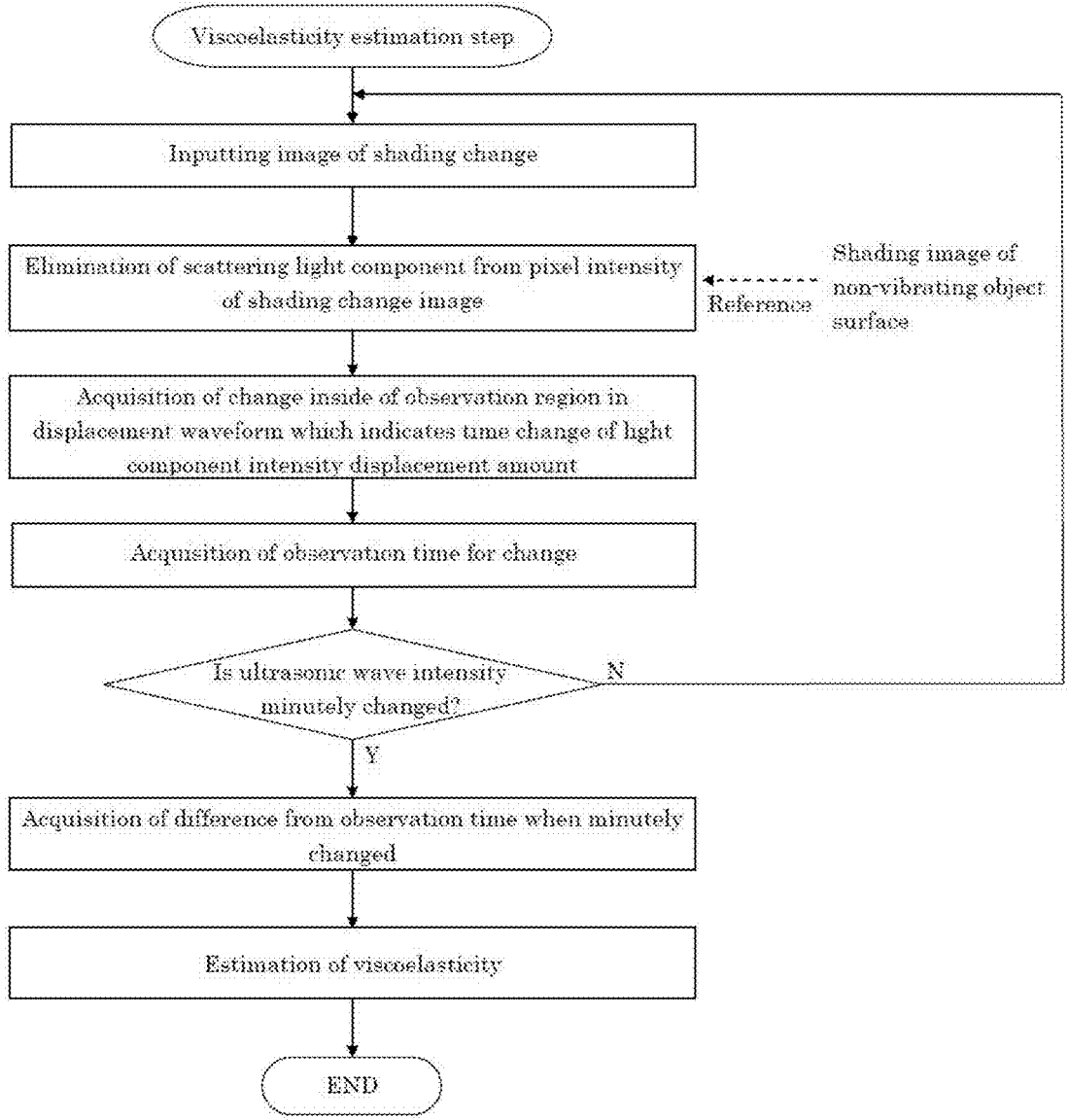
FIG. 7 shows a process flow of viscoelasticity estimation steps.

FIG. 7 shows a processing flow of the viscoelasticity estimation steps. In the viscoelasticity estimation step, the scattered light component is removed from the pixel intensity of the shading change image by referencing the previously acquired shading image of the non-vibrating object surface, after imputing the shading change image at the object surface. And the fluctuation inside the observation region in the displacement waveform of the displacement amount of the light component intensity with the scattered light eliminated is acquired. The observation time of the variation in the observation region is acquired.

Thereafter, the intensity of the ultrasonic wave is minutely changed, the image of the shading change of the object surface is input again, the scattered light component is removed from the pixel intensity of the shading change image, the change within the observation region in the displacement waveform of displacement amount of the light component intensity with the scattered light eliminated is acquired and the observation time fluctuation inside the observation region is acquired. And, a time difference between the observation time when minute change is produced and the observation time before the change occurs is acquired and the viscoelasticity is estimated, Next, the viscoelasticity estimation method is described in detail. In the following mathematical expression, the viscoelasticity of the substance of the object is represented as |C|. Firstly, the light intensity observed on the object surface is explained. When the received light intensity is expressed by I (c, t), (t represents time), I(c, t) consists of the mirror reflection component S (c, t) and the scattering component from the inside of the substance G (t, c). Here, although the mirror reflection component S (c, t) varies depending on the normal direction of the object surface, the scattering component G (t, c) stays stable. On this assumption, the observation intensity I (c) becomes proportional to the integral of the camera exposure time T.

$$I(c) = \int_{t \in T} \phi(c, t) I(c, t) dt \quad \text{[Equation 1]}$$
$$= \int_{t \in T} \phi(c, t) \{S(c, t) + G(c, t)\} dt$$
$$= \int_{t \in T} \phi(c, t) S(c, t) + G(c, t) dt$$
$$\phi(c, t) \approx \begin{cases} 1; & \text{if } S(c, t) \text{ can be observed at time } t \\ 0; & \text{otherwise} \end{cases}.$$

The vibration surface and the non-vibration surface of the object are observed by the camera located in the direction of the mirror reflection of the incident light source, and the observation Iv (c) (on the vibration surface) and the observation In (c) (on the non-vibration surface) are expressed by the mathematical equation below using the observed mirror reflection component S(c) and the observed scattering component G (c). Here, as shown in FIG. 6, the time $\theta$ is the total time ($\theta=\theta_0+\theta_1+\theta_2$) of the observation time within the observation range of the single oscillation period of the reflected light within the pixel of the camera sensor. Also, a depends on the time $\theta$ and the phase $\omega$ of the sinusoidal waveform. With respect to each $\varphi$, the angles $\varphi_1$ and $\varphi_1$ can be geometrically estimated from the relationship between the object surface and the camera position as shown in FIG. 4. The time observable before changing the vibration intensity by an ultrasonic wave (in the case having the displacement of the viscoelasticity |C| of the test object) depends on the vibration period (T). Therefore, when the total amount time of the observation time within the observation region for single vibration period is expressed by $\theta=Tx\,(\theta_0+\theta_1+\theta_2)/2\pi$ $$I_v(c) \approx \alpha S(c) + G(c) \quad \text{[Equation 2]}$$
$$I_n(c) \approx S(c) + G(c)$$
$$S(c) \approx \int_{t \in T} \phi(c, t) S(c, t) dt$$
$$G(c) \approx \int_{t \in T} G(c, t) dt$$
$$\alpha \approx \int_{t \in T} \phi(c, t) dt = \frac{\omega^2}{2\pi} \theta$$

In order to estimate the parameter $\alpha$ in the above equation, different shading observations of the test object surface are added by adding a slight displacement $c+\Delta c$ to the object c. Namely, it is assumed that the time $\theta$ for such an occasion is inversely proportional to the small change $\Delta c$ because the viscoelasticity of the test object c has a linear relationship within the small variation amount $\Delta c$.

$$\theta - \Delta\theta \approx \frac{|C|}{|C| + \Delta C} \theta \quad \text{[Equation 3]}$$
$$\approx \frac{c}{c + \Delta c} \theta$$
$$= \beta\theta$$

Under this assumption, the added observations can be expressed by the following mathematical expression. The time $\theta$ is obtained by solving these equations, that are the mathematical formula 2 above and the mathematical formula 4 below, simultaneously.

$$I'_v(c) = \beta\alpha S(c) + G(c) \quad \text{[Equation 4]}$$
$$\theta = \frac{2\pi(I_v(c) - I'_v(c))}{\omega^2\{(1-\beta)(I_n(c) - I_v(c)) + (I_n(c) - I'_v(c))\}} \quad \text{[Equation 5]}$$

Then, the viscoelasticity |C| of the substance of the test object is calculated using the following mathematical equation that includes $y_1$, $y_2$ and $\delta_1$. Here, $y_1$, $y_2$ and $\delta_1$ are calculated using the angles $\varphi_0$ and $\varphi_1$ in FIG. 4, and $y_1$, and $y_2$ are parameters for determining the observation region.

$$|C| = \frac{y_1 - y_2}{A} \quad \text{[Equation 6]}$$
$$A \approx 2\sin\left(\frac{\theta + 4\delta_1}{4}\right)\cos\left(\frac{\theta}{4}\right)$$

Embodiment 4

Here, the viscoelasticity measurement results of soap bubble liquid as an example as liquid substance using the method for measuring viscoelasticity and the apparatus for measuring viscoelasticity described above are explained.

Figure 9:
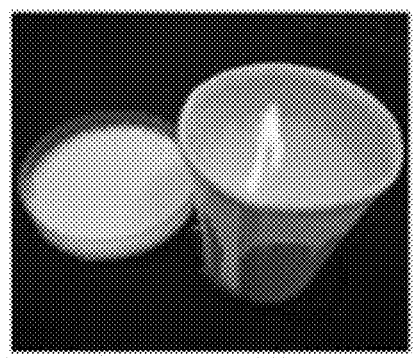
FIG. 9 shows an image of a shading change in a measurement of viscoelasticity of soap bubble liquid in a container.
Figure 9:
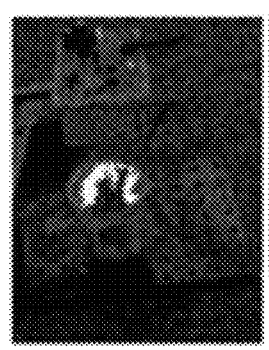
Figure 9:
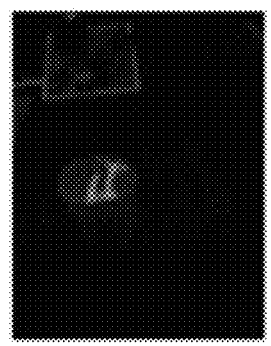
Figure 9:
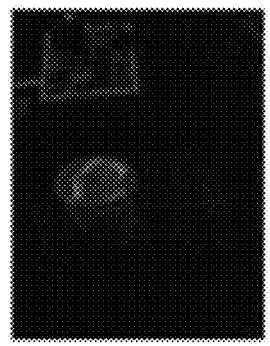
Figure 9:
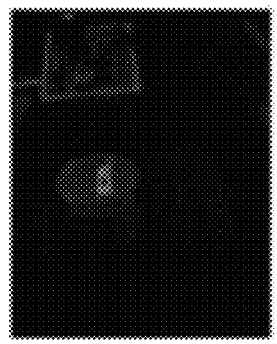

FIG. 9 shows an image of the shading change in the measurement of the viscoelasticity of the soap bubble liquid in a container. FIG. 9 (*a*) is a captured image of the bubble liquid of the test object to be measured, more specifically an imaging of bubble liquid contained in 2 kinds of containers having different volumes (a 5 mL container on the left and a 25 mL container on the right). FIG. 9 (*b*) is an image of a shading change in a non-vibration state (a state where no ultrasonic wave is transmitted) with a camera. FIGS. 9 (*c*) and 9 (*d*) are images obtained by a shading change in a slight vibration state (a state wherein ultrasonic waves are being transmitted) with a camera. FIGS. 9(*c*) and 9(*d*) are images obtained by a shading change in a slight vibration state (a state wherein ultrasonic waves are being transmitted) by the camera. FIG. 9 (*e*) shows a viscoelasticity estimation map of soap bubble liquids of two kinds of capacities.

Here, a camera with a resolution of 1280×1024, 16 bits and 30 fps was used. For an ultrasonic transmitter, a one with 0.064 (N/m) was used. For the illumination light source, a projector light source was used. And, 3 kinds of images in FIGS. 9 (b) to (d) were obtained as shading images of the surface of the soap bubble liquid by the camera.

From the viscosity estimation map shown in FIG. 9(e), it was possible to confirm that the rigid part of the container around the soap bubble liquid has lower viscoelasticity than the soap bubble liquid part.

Figure 10:
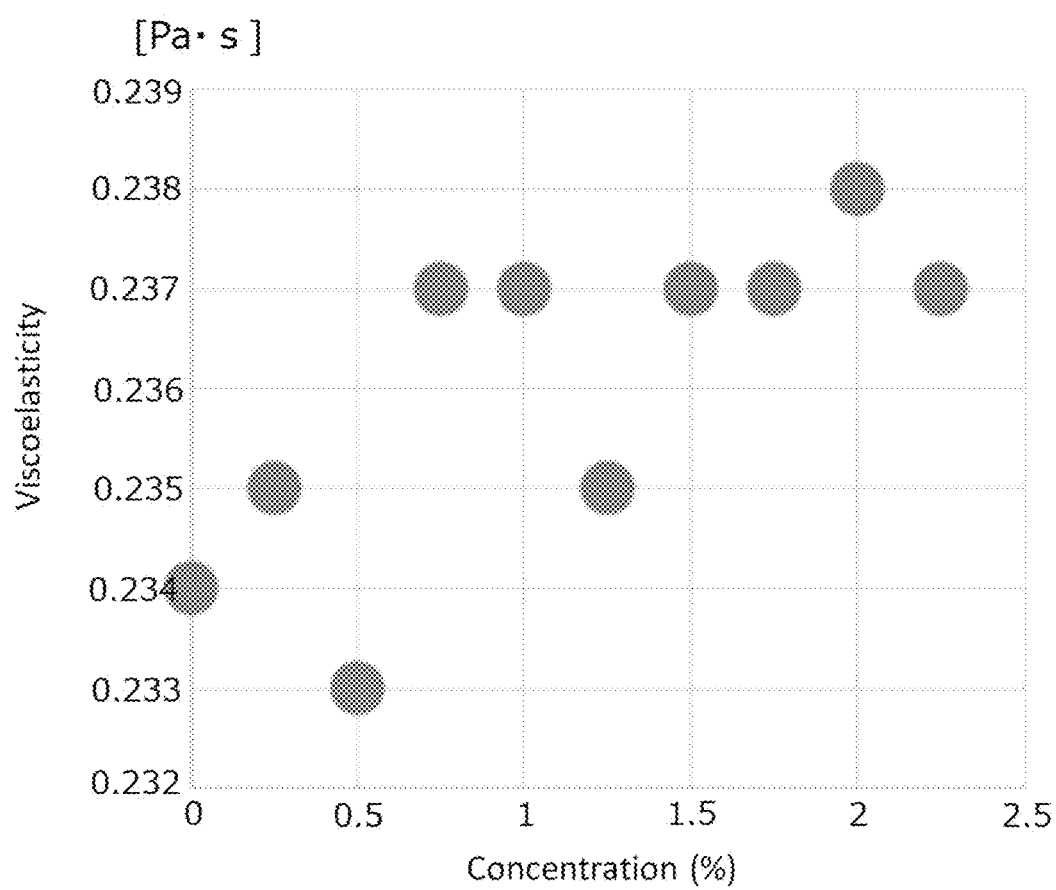
FIG. 10 shows a plot of measurement result of viscoelasticity of soap bubble liquid in a container.

FIG. 10 shows a plot of the measurement result of the viscoelasticity of the soap bubble liquid in a container. It is known that the viscoelasticity changes when the concentration of the soap bubble liquid changes. From the plot of the round mark of the estimation result in FIG. 10, it can be seen that the viscoelasticity increases generally in proportion to the concentration of the soap bubble liquid. Namely, the estimation result of the viscoelasticity changes in a similar manner as the viscoelasticity of the known soap bubble liquid, indicating that the viscoelasticity can be estimated by using the method for measuring viscoelasticity and apparatus for measuring viscoelasticity in the embodiment.

Regarding the viscoelasticity value of the plot in FIG. 10, there is instability of scale multiplication factor.

Here, since this method estimates the viscoelasticity utilizing minute changes, it is presumed, in the case of bubble liquid measurement, that the viscoelasticity partly did not increase in proportion to the concentration because of the strong influence of a mechanical shock of soap bubble bursting and interfacial tension.

Embodiment 5

As described above, since ultrasonic waves are compressional waves of air, it is possible to perform a mechanical function in a non-contact manner with respect to the object. As shown in FIG. 8, the ultrasonic transmitter 60 used in the following embodiment is configured with the ultrasonic transmitter modules 10 being densely arranged.

The ultrasonic waves radiated from each of the ultrasonic modules 10 interfere with each other in a space and strengthen each other, whereby it is possible to generate a dynamic force at an arbitrary point in the space. The dynamic force by the ultrasonic wave can be finely adjusted down to 0.1 to 0.5 g by adjusting the volume in a similar manner as a speaker. Periodic compressional waves are output from each ultrasonic module 10, and the force $\Gamma(t)$ for exciting the target objet can be expressed by the following equation.

$$\Gamma(t)=\gamma \cos(2\pi f_M t) \quad \text{[Equation 7]}$$

Here, $\gamma$ [Pa·s] represents the maximum force for pressing the target object, and $f_M$ represents the frequency whereat the target object is excited. Also, t represents time. Although the frequency output from the ultrasonic module 10 is the ultrasonic module specific, it is possible to vibrate the target object with a force of an arbitrary frequency by modulating the signal output from the ultrasonic wave. When the target object is vibrated with ultrasonic waves of the same frequency for a sufficiently long time by using the ultrasonic transmitter 60, the displacement x(t) on the target object can be expressed by the following equation.

$$x(t)=|C| \cos(2\pi f_M t+\delta) \quad \text{[Equation 8]}$$

Here, C represents the maximum displacement on the target object, and $\delta$ represents the phase delay of the vibration determined by the ratio of elasticity and viscosity. In this case, the relationship between the maximum stress due to ultrasonic waves and the maximum displacement C can be expressed by the following equation. Here, G represents the dynamic viscoelasticity. In the following embodiments, the maximum displacement C is estimated from the observed shading distribution information and the dynamic viscoelasticity G of the target object is estimated from the relationship with the stress.

$$C=\gamma G \quad \text{[Equation 9]}$$

In order to estimate the dynamic viscoelasticity G, the target object is minutely displaced by ultrasonic waves, and thereby the change that occurs in the normal direction on the target object is utilized.

Figure 11:
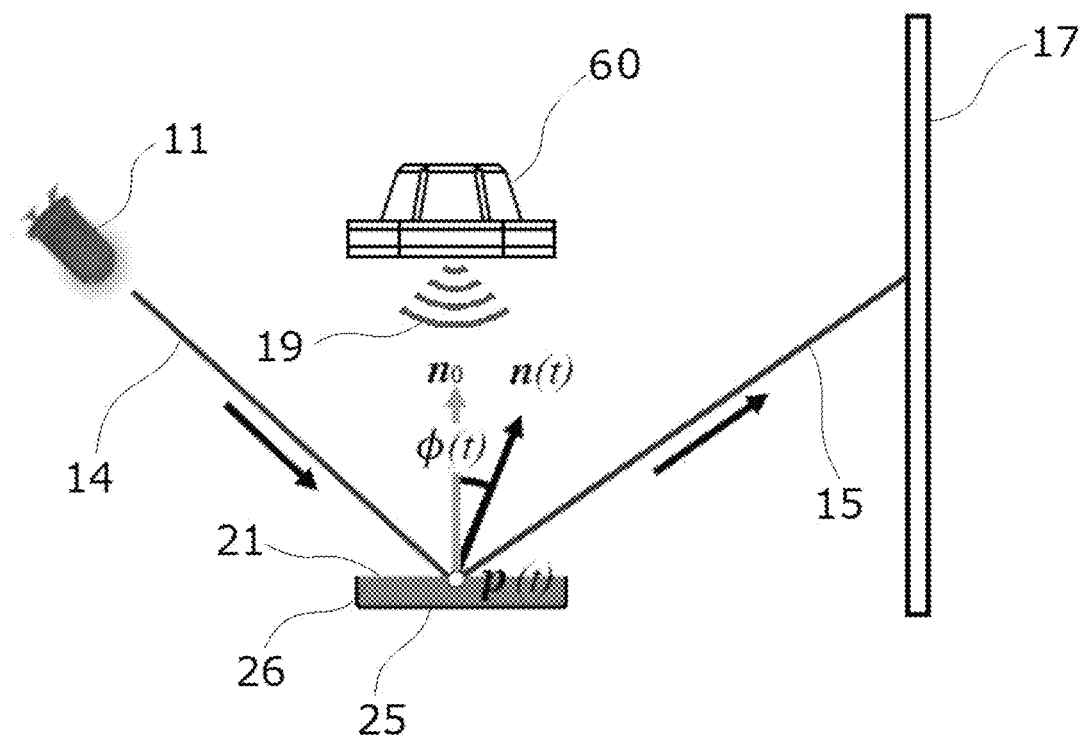
FIG. 11 shows a conceptual view of an optical system for measuring dynamic viscoelasticity.

As shown in FIG. 11, the irradiation light 14 emitted from the light source 11 is reflected on the target object 26 placed in the container 25, becomes reflected light 15, and is incident on the light receiving surface 17 (diffuse reflection plate). At this time, the point of incidence on the light receiving surface 17 is determined by the reflection position on the target object 26 and the normal direction. When the target object 26 is vibrated by the ultrasonic wave 19 outputted from the ultrasonic transmitter 60 and the exciting force is sufficiently weak, the displacement occurring on the target object 26 becomes negligibly small. However, due to the change in the normal direction occurring on the target object 26, the position at which the reflected light 15 is incident on the light receiving surface 17 is largely different. When the target observation time is sufficiently longer than the period of vibration, the reflected light on the light receiving surface 17 is observed with an expansion due to the afterimage effect. When the position of a camera (not shown) that images the shading distribution information of the light receiving surface 17, the excitation position on the target object 26, and the position of the light receiving surface 17 are known, the brightness and the spread observed on the light receiving surface 17 can be determined geometrically.

More specifically, the shading distribution information I (x, y) observed in the local region on the light receiving surface 17 is proportional to the intensity of the light incident on the local region and the incident time. Therefore, in order to estimate the shading distribution information I (x, y), the time when light enters each local region is estimated. When the target object surface is static, the normal direction is always $n_0$. Therefore, the mirror reflection direction does not change, and mirror reflection light reflected on the target object 26 is incident only on one point on the light receiving surface 17. In such a case, the observed shading distribution information is the maximum value $I_{MAX}$ and can be expressed by the following equation.

$$I_{MAX} = \alpha \int E\delta(\phi)d\phi, (-\pi \leq \phi < \pi) \quad \text{[Equation 10]}$$
$$= \gamma E$$

Here, $\alpha$ is a proportionality constant that converts the radiance E of the light receiving surface 17 into the observed shading distribution information. Also, $\varphi$ represents the difference in angle with the normal direction $n_0$ of the static state. Also, $\delta$ (•) represents the Dirac's delta function.

Figure 12:
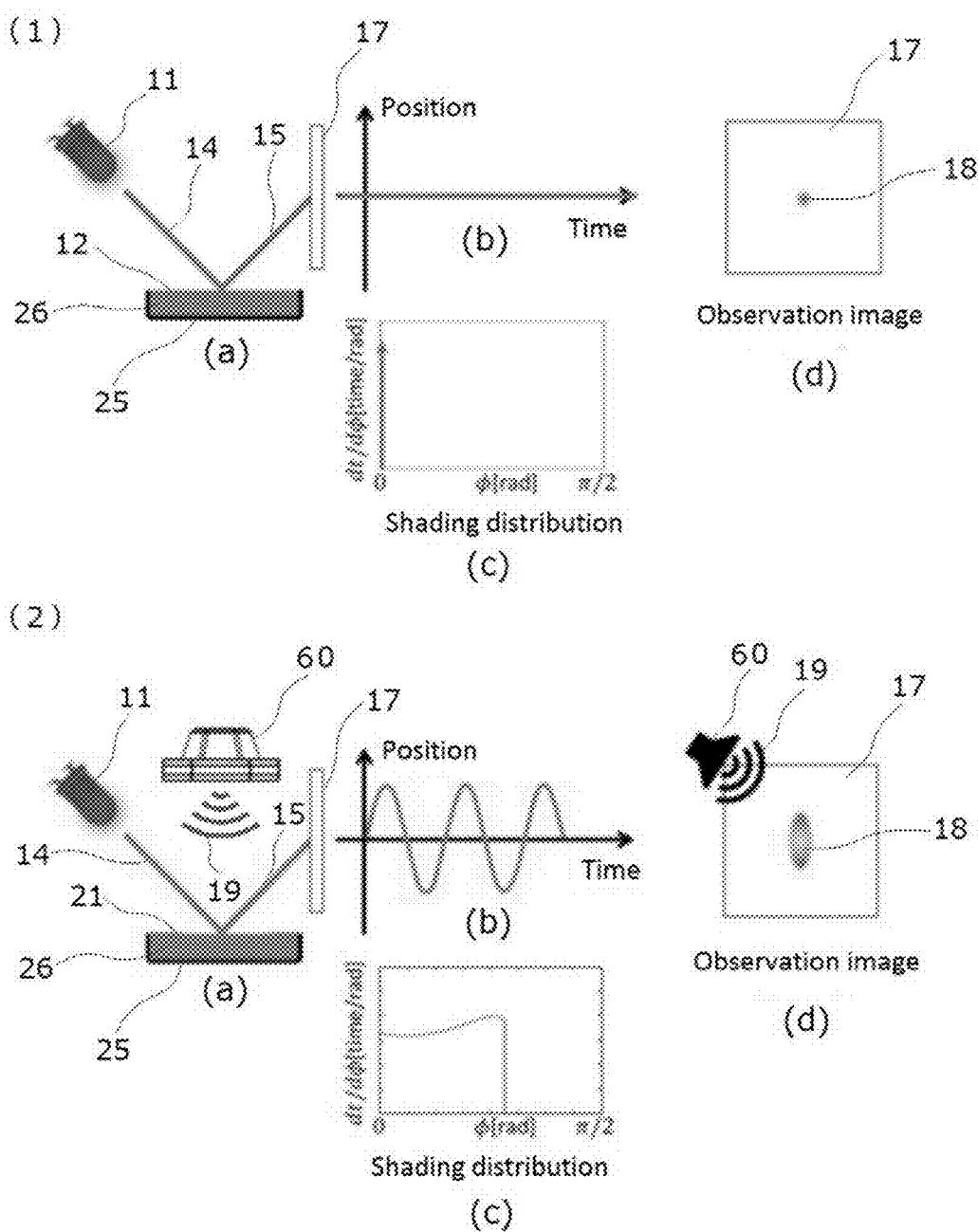
FIG. 12 shows an explanatory view of measurement of dynamic viscoelasticity.

As shown in FIG. 12 (1) (a), when ultrasonic waves are not radiated and the surface of the target object 26 is static, the difference $\varphi$ [Rad] from the normal direction is always 0 (see FIG. 12 (1) (b)), since the reflected light is observed in only one direction, the shading distribution is spatially represented as an impulse response (see FIGS. 12 (1) and (c)). The light receiving area 18 of the light receiving surface 17 is dotted, and the observation image becomes such, as shown in FIG. 12 (1) (*d*).

On the other hand, as shown in FIG. 12 (2) (*a*), in a case wherein the ultrasonic wave is irradiated by the ultrasonic transmitter 60, the surface of the object substance 26 is slightly vibrated, and the displacement of the object surface is negligibly small, the mirror reflection direction is determined depending only on the normal direction and the periodically displaced reflected light is observed (refer to FIG. 12 (*a*) (c)). Also, the shading distribution becomes as shown in FIG. 12 (2) (*c*), which makes the shape of the light receiving area 18 of the light receiving surface 17 spreading in the up and down directions, and the observation image becomes the one as shown in FIG. 12 (2) (*d*).

Here, the inclination of the position p(t) can be expressed by the equation below.

$$\frac{d}{dt}y = -\omega|C|\sin(\omega t + \delta) \qquad \text{[Equation 11]}$$

From the above equation, the inclination direction a (t) can be obtained from the following equation.

$$a(t) = \left(\frac{1}{\sqrt{1+\omega^2|C|^2\sin^2(\omega t+\delta)}}, \frac{\omega|C|\sin(\omega t+\delta)}{\sqrt{1+\omega^2|C|^2\sin^2(\omega t+\delta)}}\right) \qquad \text{[Equation 12]}$$

Since the inclination direction and the normal direction are orthogonal to each other, the relationship between the inclination direction a (t) and the normal direction n (t) can be expressed by the following mathematical expression using the rotating matrix R:

$$n(t)=R(\pi/2)a(t) \qquad \text{[Equation 13]}$$

Here, the elements of the rotation matrix R can be uniquely determined from the condition that the two vectors are orthogonal. As shown in FIG. 11, the cosine cos φ (t) formed by $n_0$ and n(t) and φ (t) can be expressed by the equation below.

$$\cos\phi(t) = n_0 \cdot n(t) \qquad \text{[Equation 14]}$$

$$\phi(t) = \arccos\frac{1}{\sqrt{1+\omega^2|C|^2\sin^2(\omega t+\delta)}} \qquad \text{[Equation 15]}$$
$$= \arctan(\omega|C|\sin(\omega t + \delta))$$

And due to the fact that the reflection distribution caused by the vibration of the normal line is expressed as the reciprocal of the angle velocity, dt/dφ can be estimated using the following mathematical expression. The reflectance distribution at p(t) can be estimated from dt/dφ.

$$\frac{dt}{d\phi} = \frac{1+\omega^2|C|^2\sin^2(\omega t+\delta)}{\omega^2|C|\cos^2(\omega t+\delta)} \qquad \text{[Equation 16]}$$

By taking the ratio of the static shading distribution information observed when the target object surface is static to the dynamic shading distribution information observe when the target object surface is slightly vibrating, it is possible to estimate the time wherein the light enters the position observed within 1 cycle. For this reason, the dynamic viscoelasticity G can be estimated from 2 kinds of shading distribution information, one being with the static object substance surface and another being with minute vibration, and from the estimation equation of dt/dφ described above.

Note that, in the examples described later, the dynamic viscoelasticity G is expressed simply as the viscoelasticity.

Embodiment 6

The measurement results of the viscosity change (change in viscoelasticity) due to the temperature change of water using the method for measuring viscoelasticity and apparatus for measuring viscoelasticity shown in the Embodiment 5 described above are explained.

Figure 13:
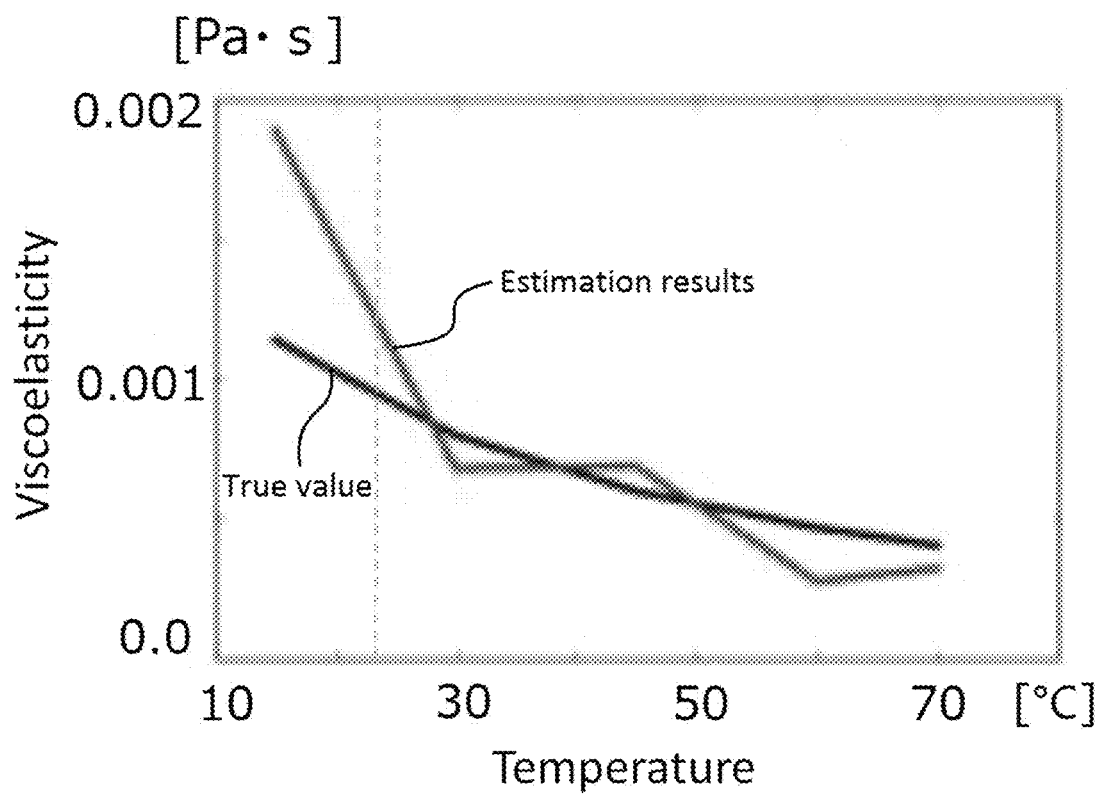
FIG. 13 shows a measurement graph (Embodiment 6) of viscoelasticity representing a viscosity change due to a temperature change of water.

FIG. 13 shows a measurement graph of viscoelasticity representing the viscosity change due to the temperature change of water. In the graph of FIG. 13, the true value of the viscoelasticity of water and the result estimated by the method for measuring viscoelasticity described in the above mentioned embodiment are shown in the temperature range of water between 15° C. and 70° C. The estimation results are plots when the water temperatures are 15° C., 30° C., 45° C., 60° C., 70° C.

In the graph of FIG. 13, the viscoelasticity estimation result of water in a case wherein the temperature of water is changed shows a tendency that the viscoelasticity decreases as the temperature rises, and it was confirmed that this tendency is similar to that of the true value of the viscoelasticity accompanying the rise of the water temperature. From this result, it was found that the method for measuring viscoelasticity of the embodiment can capture minute changes in viscoelasticity due to the temperature change of water, and the changed viscoelasticity can be estimated.

Embodiment 7

The measurement result of the viscosity change (viscoelasticity change) in the curing process of the adhesive using the method for measuring viscoelasticity and apparatus for measuring viscoelasticity described in the Embodiment 5 described above is described.

Figure 14:
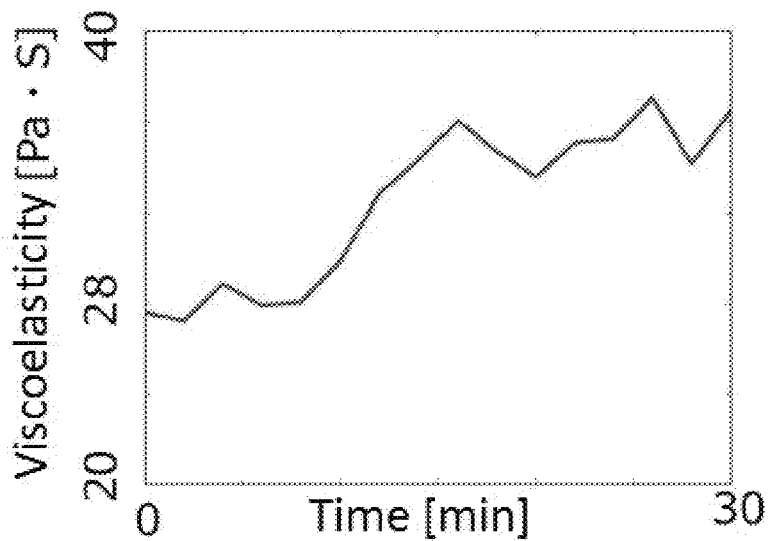
FIG. 14 shows a measurement graph (Embodiment 7) of viscoelasticity showing a change of viscoelasticity in a curing process of an adhesive.

FIG. 14 is a measurement graph of the viscoelasticity showing a change of viscoelasticity in the curing process of an adhesive.

A commercially available woodworking bond (a product manufactured by Konishi Co., Ltd.) was used as the adhesive. The adhesive was dropped on the surface of the glass substrate and dried in natural way to measure the viscosity from the point of time after dropping (0 minutes) to the time lapse of 30 minutes. The measurement was conducted every 2 to 3 minutes. From the graph in FIG. 14, a tendency can be read that the viscoelasticity estimation results in the curing process of the adhesive become higher with the time lapse, which coincides with the phenomenon in which the adhesive dries to become a highly elastic body such as rubber.

Embodiment 8

The measurement result of the viscoelasticity of lubricating oil with a known ISO (International Organization for Standardization) viscosity grade as a substance of a known viscoelasticity, using the method for measuring viscoelasticity and the apparatus for measuring viscoelasticity mentioned above, is described here.

It is known that the elastic component of the liquids such as lubricating oil is small enough to be ignored. For this reason, all the estimation results were to be regarded as the viscosity component in this experiment. Three kind of lubricating oils (made by Sankyo Corporation) were used in this experiment, which are lubricating oil for turbine (Oil VG32), lubricating oil for compressor (Oil VG68) and lubricating oil for chain saw (Oil VG100), respectively. Here, VG is the viscosity grade defined by the international standard of ISO, and the number after VG is the viscosity index. The larger the viscosity index is, the higher the viscosity becomes, while the smaller the viscosity index becomes, the lower the viscosity becomes.

Figure 15:
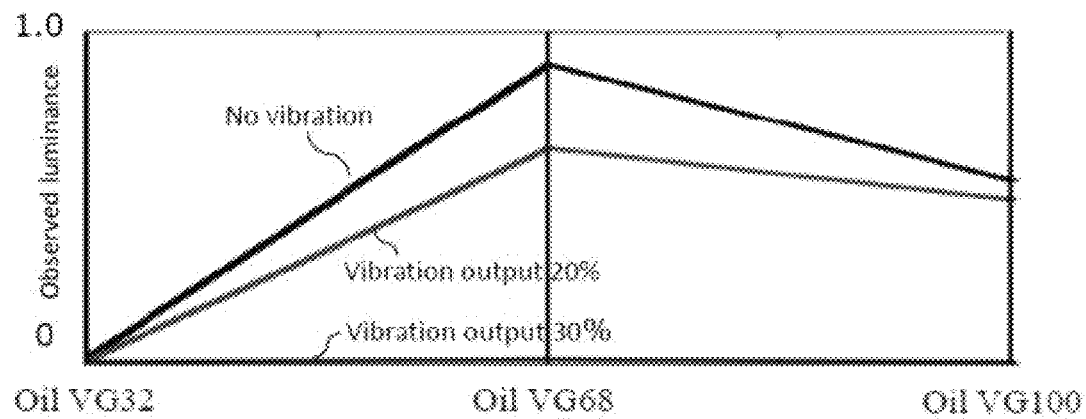
FIG. 15 shows a measurement graph (Embodiment 8) of viscoelasticity of oil having a known viscosity grade.
Figure 15:
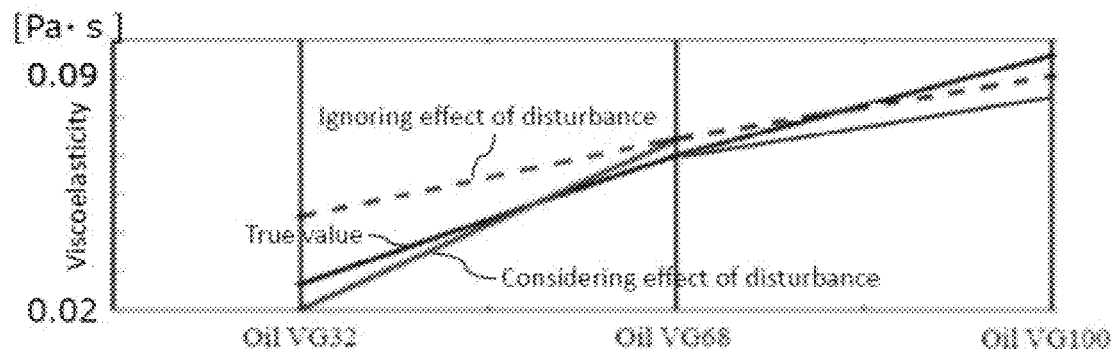

FIG. 15 and Table 1 below show measurement results of viscoelasticity of lubricating oil having a known viscosity grade. FIG. 15 (1) shows the observed shading distribution information, and FIG. 15 (2) shows the true value and the estimation result of the viscoelasticity of the lubricating oil. It can be seen, in FIG. 15 (1), that the observed luminance of the lubricating oil surface becomes small as the vibration output becomes smaller such as 20% and 30% starting from the case wherein there is now ultrasonic vibration. Also, FIG. 15 (2) shows that the estimated viscoelasticity of the lubricating oil surface is in a proportional relationship and the estimated viscoelasticity value (considering the influence of disturbance) mostly approximates the true value as shown in Table 1, which confirms that the estimation is correctly conducted. Note that the estimated viscoelasticity value considering the effect of disturbance tends to be a better estimated value with higher stability than the estimated value ignoring the effect of disturbance, as is shown in FIG. 15 (2). The effect of disturbance here means the effect of component other than the mirror reflection, namely the scattering light, the diffused reflected light and the environmental light.

TABLE 1

|  | Oil VG32 | Oil VG68 | Oil VG100 |
|---|---|---|---|
| True value [Pa · s] | 0.02672 | 0.06008 | 0.08594 |
| Estimated viscoelasticity value [Pa · s] | 0.02014 | 0.06408 | 0.08055 |

Embodiment 9

The results of viscoelasticity measurement using the method for measuring viscoelasticity and apparatus for measuring viscoelasticity described in Embodiment 5 as mentioned above, on various measurement target objects existing in the environment are described.

Nine kinds of objects having different appearance colors and different degrees of mirror reflection were used as targets objects. The 9 kinds of objects are water, soy sauce, salad oil, pepper sauce, mayonnaise, honey, rice malt, barbecue sauce and ketchup. Since the touch of these 9 kinds of objects with a hand is different each other, it is expected that the viscoelasticity estimation result for each object is expected to be different.

The temperature of the experimental environment was controlled at 20° C. by using an air conditioning and a sufficient time was taken before measurement so that the temperature of the object to be measured also becomes the same temperature as the experimental environment. Also, 9 kinds of objects were placed separately in 9 Petri dishes and measured. In the measurement, a light-absorbing sheet was placed at the bottom of each Petri dish in order to prevent the influence of a mirror reflection at the bottom of each Petri dish.

Figure 16:
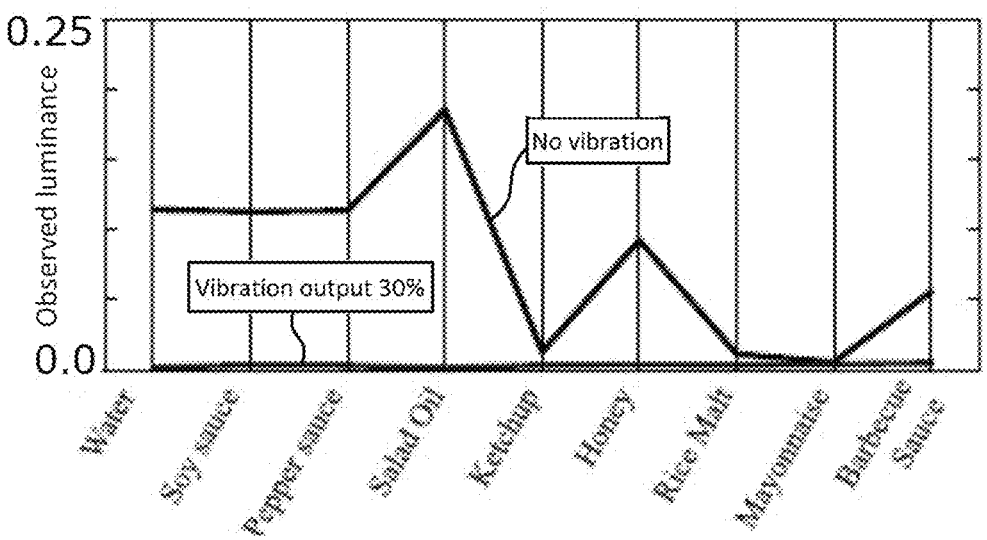
FIG. 16 shows a viscoelasticity measurement graph (Embodiment 9) of nine kinds of measurement target objects.
Figure 16:
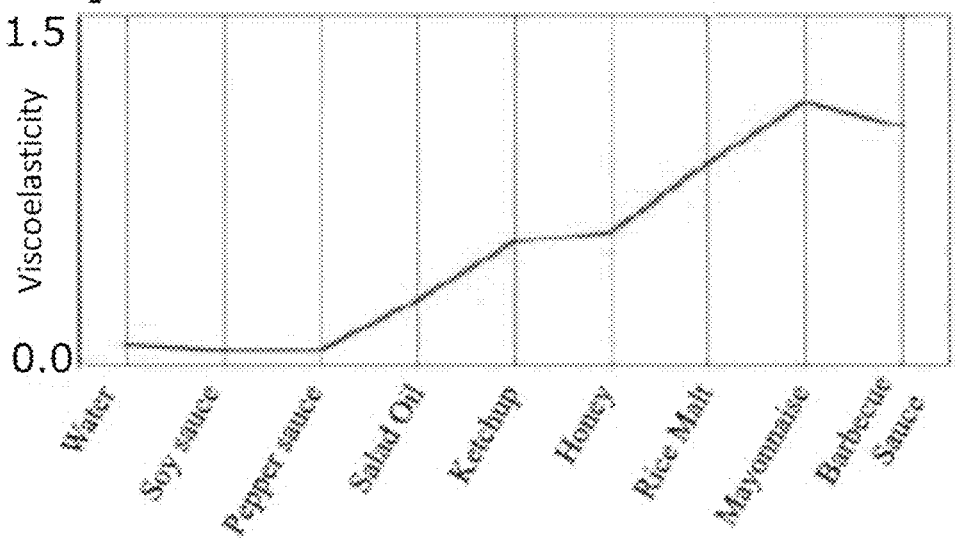

FIG. 16 is a viscoelasticity measurement graph of 9 kinds of measurement target objects. FIG. 16 (1) shows the observed shading distribution information and FIG. 16 (2) shows the estimation result of the viscoelasticity of the object to be measured. From the estimation result in FIG. 16 (2), it is confirmed that each viscoelasticity of 9 kinds of measurement target objects is almost correctly estimated not being influenced by the appearance color and the degree of reflection, confirming the effectiveness of the method for measuring viscoelasticity and the apparatus for measuring viscoelasticity of the above mentioned Embodiment. Note that the FIG. 16 (2) is drawn while considering the influence of disturbance (influence of scattered lights, diffused reflection lights and ambient lights).

INDUSTRIAL APPLICABILITY

The present invention is useful for quality survey of fresh items in the agricultural field and the fishery field, estimation of food relishing period and quantification of dishes. Also, the present invention is useful as a diagnostic apparatus for quantifying palpation in the medical field and a diagnostic apparatus used under circumstances wherein direct palpation cannot be performed during endoscopic surgery and so on.

DESCRIPTION OF SYMBOLS

1 Apparatus for measuring viscoelasticity
2 Ultrasonic wave emitting unit
3 Photoirradiating unit
4 Camera unit
5 Estimation unit
10 Ultrasonic transmission module
11 Illumination light source
12 Object surface
13 Object interior
14 Irradiation light
15, 15a~15d Reflected light
16 Scattered light
17 Light receiving surface
18 Light receiving region portion
19 Ultrasonic wave
20 Minute displacement
21 Shape-deformed object surface
25 Container
26 Target object
30 Camera lens
31 Camera sensor
40 Camera
50 Computer
60 Ultrasonic transmitter, Ultrasonic array

What is claimed is:

1. A method for measuring viscoelasticity in a non-contact and non-destructive manner by estimating viscoelasticity using a shading change based on a change in a normal direction at a surface of an object from irradiating an elastic wave and light on the object, the method comprising:
estimating viscoelasticity at least in part by using a shading image at the object surface in two kinds of minute vibration by minutely changing an intensity of an elastic wave; and calculating viscoelasticity at least in part from a shading change based on an observation time in an observation area determined by a positional relationship between the object surface and a camera portion with respect to a single oscillation period of a displacement waveform of a displacement of a light component intensity excluding a scattering light component after eliminating a scattering light component from a pixel intensity of an image of a shading change acquired by using a shading image at a non-vibrational object surface.

2. The method for measuring viscoelasticity as set forth in claim 1, further comprising:
pressurizing or exciting the object by elastic waves and causing a minute displacement of the object surface shape;
radiating light against the object surface being minutely displaced;
acquiring a shading change based on a change of the object surface in a normal direction; and
calculating viscoelasticity by acquiring a displacement magnitude of a pixel intensity from an image of an acquired shading change.

3. The method for measuring viscoelasticity as set forth in claim 1, said elastic wave being an acoustic wave or an ultrasonic wave having a frequency not limited to a specific frequency including a resonance frequency of the object for measurement.

4. The method for measuring viscoelasticity as set forth in claim 1, further comprising generating a shading change based on a change of the object surface in normal direction by a reflected light of an irradiation light reflected at the object surface or by a transmitted light being refracted.

5. The method for measuring viscoelasticity as set forth in claim 1, further comprising:
acquiring static shading distribution information by irradiating light on the object surface in static state with an elastic wave not being applied;
minutely displacing the object surface's shape by pressurizing or vibrating the object;
irradiating light on the object surface with minute displacement;
acquiring dynamic shading distribution information based on vibration of normal line on the object surface;
estimating a maximum displacement caused by an elastic wave of the object by calculating angular velocity of vibration of a normal line after calculating time of 1 cycle of said vibration from a ratio of said static shading distribution information and said dynamic shading distribution information; and
calculating viscoelasticity from estimated maximum displacement and maximum stress by the elastic wave.

6. A method for measuring viscoelasticity comprising estimating viscoelasticity using a shading change based on a change in a normal direction at a surface of an object from irradiating an elastic wave and light on the object, the method further comprising transmitting a plurality of sound waves with each sound wave being focused in phase to vibrate at a focus point on the object surface, or transmitting a plurality of sound waves with each sound wave being in phase and in parallel, or performing both transmitting operations, whereby the object surface vibrates in-plane.

7. The method for measuring viscoelasticity as set forth in claim 6, further comprising calculating viscoelasticity at least in part from a shading change based on an observation time in an observation area determined by a positional relationship between the object surface and a camera portion with respect to a single oscillation period of a displacement waveform of a displacement of a light component intensity excluding a scattering light component after eliminating a scattering light component from a pixel intensity of an image of a shading change acquired by using a shading image at a non-vibrational object surface.

8. The method for measuring viscoelasticity as set forth in claim 6, further comprising generating a shading change based on a change of the object surface in normal direction by a reflected light of an irradiation light reflected at the object surface or by a transmitted light being refracted.

9. The method for measuring viscoelasticity as set forth in claim 6, further comprising:
acquiring static shading distribution information by irradiating light on the object surface in static state with an elastic wave not being applied;
minutely displacing the object surface's shape by pressurizing or vibrating the object;
irradiating light on the object surface with minute displacement;
acquiring dynamic shading distribution information based on vibration of normal line on the object surface;
estimating a maximum displacement caused by an elastic wave of the object by calculating angular velocity of vibration of a normal line after calculating time of 1 cycle of said vibration from a ratio of said static shading distribution information and said dynamic shading distribution information; and
calculating viscoelasticity from estimated maximum displacement and maximum stress by the elastic wave.

10. An apparatus for measuring viscoelasticity using a shading change based on a change in a normal direction at a surface of an object from irradiating an elastic wave and light on the object, the apparatus comprising:
an elastic wave transmission unit having a plurality of sound wave transmission modules configured to displace the object surface's shape by pressuring or stimulating the object by an elastic wave;
each sound wave transmission module being disposed so that each transmitted sound wave is focused in phase and said elastic wave transmission unit being disposed with a convergent point being positioned at the object surface; or
each sound wave transmission module being disposed so that each transmitted sound wave is transmitted in phase and in parallel to make the object surface vibrate in plane.

11. The apparatus of claim 10, further comprising:
a static shading distribution information acquiring unit;
an elastic wave transmission unit;
a photoirradiating unit;
a dynamic shading distribution information acquiring unit;
a maximum displacement estimation unit which in operation estimates a maximum displacement of an object by an elastic wave by calculating a time of 1 cycle of said vibration and calculating an angular velocity of a vibration of normal line, from a ratio of static shading distribution information to dynamic shading distribution; and
a viscoelasticity estimation unit which in operation calculates an estimated viscoelasticity from estimated maximum displacement and maximum stress by an elastic wave.

12. A method for measuring viscoelasticity in a non-contact and non-destructive manner by estimating viscoelasticity using a shading change based on a change in a normal direction at a surface of an object from irradiating an elastic wave and light on the object, the method comprising:

estimating viscoelasticity at least in part by using a shading image at the object surface in two kinds of minute vibration by minutely changing an intensity of an elastic wave; and generating a shading change based on a change of the object surface in normal direction by a reflected light of an irradiation light reflected at the object surface or by a transmitted light being refracted.

13. The method for measuring viscoelasticity as set forth in claim 12, further comprising:

pressurizing or exciting the object by elastic waves and causing a minute displacement of the object surface shape;

radiating light against the object surface being minutely displaced;

acquiring a shading change based on a change of the object surface in a normal direction; and calculating viscoelasticity by acquiring a displacement magnitude of a pixel intensity from an image of an acquired shading change.

14. The method for measuring viscoelasticity as set forth in claim 12, said elastic wave being an acoustic wave or an ultrasonic wave having a frequency not limited to a specific frequency including a resonance frequency of the object for measurement.

15. The method for measuring viscoelasticity as set forth in claim 12, further comprising:

acquiring static shading distribution information by irradiating light on the object surface in static state with an elastic wave not being applied;

minutely displacing the object surface's shape by pressurizing or vibrating the object;

irradiating light on the object surface with minute displacement;

acquiring dynamic shading distribution information based on vibration of normal line on the object surface;

estimating a maximum displacement caused by an elastic wave of the object by calculating angular velocity of vibration of a normal line after calculating time of 1 cycle of said vibration from a ratio of said static shading distribution information and said dynamic shading distribution information; and calculating viscoelasticity from estimated maximum displacement and maximum stress by the elastic wave.

* * * * *